Feb. 28, 1961    M. WORMAN    2,972,981
ROCK DRILL
Filed April 18, 1960
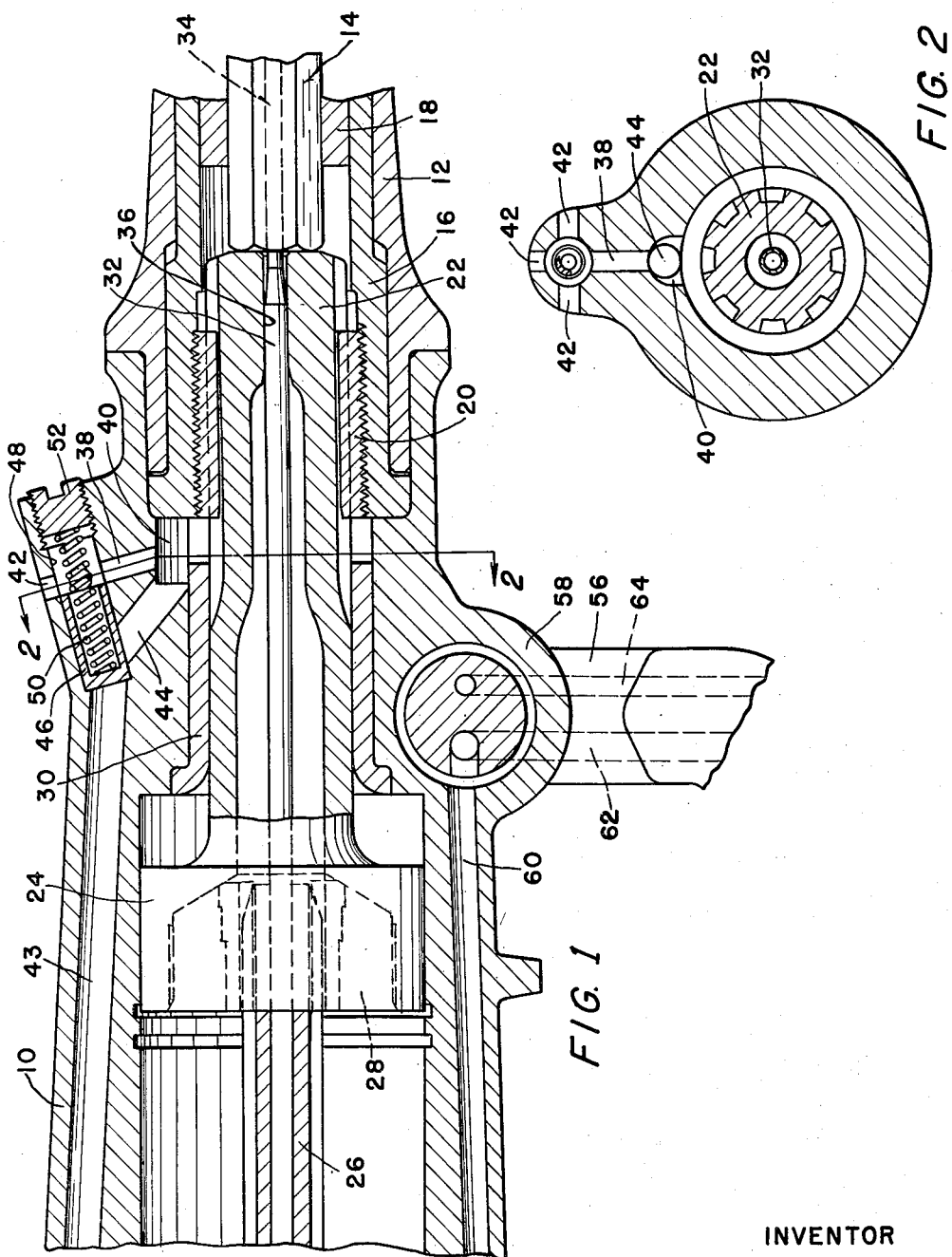
INVENTOR
*MARTIN WORMAN*
BY
HIS ATTORNEY

United States Patent Office 2,972,981
Patented Feb. 28, 1961

2,972,981
ROCK DRILL

Martin Worman, Phillipsburg, N.J., assignor to Ingersoll-Rand Company, New York, N.Y., a corporation of New Jersey Filed Apr. 18, 1960, Ser. No. 22,757
6 Claims. (Cl. 121—10)

This invention relates to pneumatic rock drills, and more particularly to that type of rock drills which are pneumatically operated and provided with fluid supply for cleansing the bottom of the hole being drilled.

In modern drilling practice in certain types of rock particularly those of high silica content it is customary to avoid the use of air under pressure at the bottom of the hole for keeping the rock face clean. Instead, water is fed usually down through the hollow drill steel to the rock face and precautions are taken to avoid leakage air from accompanying the water. Accordingly the drill chuck is vented to atmosphere so that any air leaking from the drill cylinder into the chuck will pass out to atmosphere without being entrained with the stream of water passing into the drill steel.

Under certain conditions the cuttings accumulate in the drill hole and they must be blown out by air. For this purpose a blast of air is delivered into the chuck under pressure so that it will blow through the hollow steel and clean the hole. This can be wasteful of air passing out through the chuck vent thus reducing the benefit of the blowing by dropping the air pressure.

It is accordingly an object of this invention to provide means for automatically closing the chuck vent while the air for blowing is being admitted into the chuck.

Another object of the invention is to provide such an arrangement, reliable, easily manufactured and simple in operation.

Other objects will be in part obvious and in part pointed out hereinafter.

The drawing shows parts of a rock drill embodying a preferred form of the invention and includes Figure 1, a longitudinal section through the front end of a rock drill, and Fig. 2, a cross-section at the line 2—2 looking in the direction of the arrows.

Referring to the drawing, there is shown the front end of the rock drill which is of the pneumatic hammer type and includes a cylinder 10 having a front head 12 adapted to receive a hollow drill steel 14. To contain drill steel 14, front head 12 has a chuck including a rotatable sleeve 16 within which is mounted a chuck liner 18 in this instance provided with a hexagonal bore to receive the hexagonal drill steel 14. Also included is a chuck nut 20 screwed into the rear end of chuck sleeve 16 and fluted to receive a correspondingly fluted nose 22 of a reciprocating hammer piston 24 in cylinder 10. As it reciprocates piston 24 is caused to rotate on its back stroke, usually by means of a rifle bar 26 engaged with piston 24 by means of a rifle nut 28 in the head of the piston. Rotation of piston 24 is transmitted to drill steel 14 through its fluted nose cooperating with chuck nut 20, chuck sleeve 16 and chuck liner 18. This type of construction is well understood in the art of pneumatic drills.

As a guide and seal for the nose 22, cylinder 10 is provided with a front cylinder washer 30. As is customary practice in so-called dustless drilling, water is fed by a water tube 32 positioned axially with respect to piston 24 and extending therethrough, its tip end being adapted to project into the hollow bore 34 of drill steel 14. Water tube 32 fits the aperture 36 rather closely so as to avoid as much as is practical leakage of air into the interior of chuck sleeve 16. Likewise, front cylinder washer 30 has a reasonably tight running fit with nose 22 of piston to avoid, as well as may be, leakage of air into the interior of the chuck where it might find its way into the hollow bore 34 of the drill steel. Some leakage is bound to occur and to avoid accumulation of air under pressure inside the chuck a vent is provided, in this case a vent passage 38 through the wall of cylinder 10 at one end terminating in the space 40 between front cylinder washer 30 and chuck nut 20, and at its other end leading to the open air, as shown at 42.

As has been said above it is occasionally necessary to blow air through the steel 14 to loosen or remove cuttings from the drill hole. This is done when the drill has stopped its hammering operation and it does not often raise dust particles in the air because the cuttings are thoroughly wetted before blowing starts. For blowing purposes a blower port 43 extending longitudinally in the wall of cylinder 10 is adapted to be connected to a suitable source of air under pressure (not shown). Blower port 43, at its forward end, also terminates at space 40 and has a passage 44 therefor, angularly disposed with respect to the main length of port 43.

By this invention, there is provided means for simultaneously closing off vent passage 38 when air under pressure is admitted to blower port 43. To this end there is provided a valve 46 extending into blower port 43 at its juncture with passage 44. Valve 46 is provided with a bore 48 in the wall of cylinder 10 transversely disposed with respect to vent 38. Valve 46 is cup-shaped, its closed end being seated in blower port 43 and inside it, is contained a coil spring 50, bearing against a plug 52 in the end of bore 48, by means of which spring 50 is compressed to bias valve 46 to its position closing port 43 and leaving vents 42 open.

It will be seen that when pressure is admitted to blower port 43 valve 46 will move to its open position compressing spring 50 and closing vent passage 38. In this condition air introduced into the chuck will not escape to atmosphere through the vent but will for the most part pass down through the hollow bore 34 of steel 14 to blast out cuttings from the hole.

The drill shown here is of the type supported by a leg for substantially horizontal drilling. The part of such a leg adjacent the drill is indicated at 56 which is pivotally mounted on a boss 58 on cylinder 10. Air supply ports 60, 62 and 64 are indicated but their operation is not described as they are not pertinent to this invention.

Thus, by the above construction are accomplished, the objects hereinbefore referred to.

I claim:

1. A pneumatic rock drill having a cylinder, a front head to receive a drill rod, a chuck in the front head to engage such drill rod, a hammer piston in the cylinder provided with a fluted nose extending into the chuck, a chuck nut slidingly engaging the fluted nose of said piston and fixedly attached to said chuck, a front cylinder washer to guide the nose of said piston, a vent passage to conduct leakage air from the interior of said chuck to atmosphere, a blower port in said cylinder leading to the interior of said chuck, and means normally closing said port, operable to open said port and simultaneously to close said vent passage.

2. A pneumatic rock drill as set forth in claim 1 in which said means is pneumatically operable.

3. A pneumatic rock drill as set forth in claim 1 in which said means includes a valve positioned in the blower port and across the vent passage.

4. A pneumatic rock drill as set forth in claim 1 in which said means consists of a reciprocatory valve extending into the blower port with one end exposed to pressure therein, and the other end movable across the vent passage to obstruct the flow therethrough.

5. A pneumatic rock drill as set forth in claim 1 in which is provided a spring to bias the valve to position unobstructing the vent passage.

6. A pneumatic rock drill as set forth in claim 1 in which the blower port and the vent passage terminate in the space between the front cylinder washer and the chuck nut.

References Cited in the file of this patent

UNITED STATES PATENTS

| | | |
|---|---|---|
| 837,347 | Smith | Dec. 4, 1906 |
| 855,515 | Kimman | June 4, 1907 |
| 1,345,271 | Smith | June 29, 1920 |
| 1,554,985 | Bayles | Sept. 29, 1925 |
| 1,978,964 | Slater | Oct. 30, 1934 |
| 2,746,721 | Moore | May 22, 1956 |

FOREIGN PATENTS

| | | |
|---|---|---|
| 793,925 | Great Britain | Apr. 23, 1958 |

UNITED STATES PATENT OFFICE
CERTIFICATION OF CORRECTION

February 28, 1961

Patent No. 2,972,981

Martin Worman

It is hereby certified that error appears in the above numbered patent requiring correction and that the said Letters Patent should read as corrected below.

Column 1, line 52, for "contain" read -- retain --; column 3, line 6, for the claim reference numeral "1" read -- 4 --; line 7, after "valve to" insert -- a --.

Signed and sealed this 8th day of August 1961.

(SEAL)
Attest:

ERNEST W. SWIDER
Attesting Officer

DAVID L. LADD
Commissioner of Patents